(12) United States Patent
Haskell et al.

(10) Patent No.: US 8,307,295 B2
(45) Date of Patent: Nov. 6, 2012

(54) METHOD FOR CONTROLLING A COMPUTER GENERATED OR PHYSICAL CHARACTER BASED ON VISUAL FOCUS

(75) Inventors: Sabrina Haskell, Pittsburgh, PA (US); David Culyba, Berkeley, CA (US); Shane J. M. Liesegang, Venice, CA (US)

(73) Assignee: Interbots LLC, Pittsburgh, PA (US)

( * ) Notice: Subject to any disclaimer, the term of this patent is extended or adjusted under 35 U.S.C. 154(b) by 1228 days.

(21) Appl. No.: 11/906,569

(22) Filed: Oct. 3, 2007

(65) Prior Publication Data
US 2008/0088586 A1   Apr. 17, 2008

Related U.S. Application Data

(60) Provisional application No. 60/848,966, filed on Oct. 3, 2006.

(51) Int. Cl.
*G06F 13/00* (2006.01)
*G06F 15/00* (2006.01)
(52) U.S. Cl. ........................................ 715/763; 715/765
(58) Field of Classification Search .......... 715/763–765, 715/851–853, 836–848, 717–719, 730–731, 715/810, 856, 863
See application file for complete search history.

(56) References Cited

U.S. PATENT DOCUMENTS

| | | | |
|---|---|---|---|
| 4,739,406 A | 4/1988 | Morton et al. | |
| 5,636,994 A | 6/1997 | Tong | |
| 6,064,854 A | 5/2000 | Peters et al. | |
| 6,319,010 B1 | 11/2001 | Kikinis | |
| 6,370,597 B1 | 4/2002 | Eady et al. | |
| 6,377,281 B1* | 4/2002 | Rosenbluth et al. | 715/700 |
| 6,491,566 B2 | 12/2002 | Peters et al. | |
| 6,572,431 B1 | 6/2003 | Maa | |
| 6,584,376 B1 | 6/2003 | Van Kommer | |
| 6,631,351 B1 | 10/2003 | Ramachandran et al. | |
| 6,641,454 B2 | 11/2003 | Fong et al. | |
| 6,648,719 B2 | 11/2003 | Chan | |
| 6,736,694 B2 | 5/2004 | Hornsby et al. | |
| 6,752,720 B1 | 6/2004 | Clapper et al. | |
| 6,763,282 B2 | 7/2004 | Glenn et al. | |
| 6,788,768 B1 | 9/2004 | Saylor et al. | |
| 6,800,013 B2 | 10/2004 | Liu | |
| 6,879,878 B2 | 4/2005 | Glenn et al. | |
| 6,882,824 B2 | 4/2005 | Wood | |
| 6,939,192 B1 | 9/2005 | Munch et al. | |
| 6,954,199 B2 | 10/2005 | Soto et al. | |
| 6,959,166 B1 | 10/2005 | Gabai et al. | |
| 7,008,288 B2 | 3/2006 | Covannon et al. | |
| 7,025,657 B2 | 4/2006 | Nishimoto | |
| 7,035,583 B2 | 4/2006 | Ferrigno et al. | |
| 7,065,490 B1 | 6/2006 | Asano et al. | |
| 7,066,781 B2 | 6/2006 | Weston | |
| 7,068,941 B2 | 6/2006 | Fong et al. | |
| 7,069,111 B2 | 6/2006 | Glenn et al. | |
| 2008/0301578 A1* | 12/2008 | Olson | 715/802 |

* cited by examiner

*Primary Examiner* — Cao "Kevin" Nguyen
(74) *Attorney, Agent, or Firm* — David G. Oberdick; Peter J. Borghetti

(57) ABSTRACT

A user interface allows an operator to control the visual focus of digital, CG characters and/or physical robotic characters. An interface with one or more tiered shapes is overlaid on a video feed of the digital or physical character's surrounding environment. An operator can move the overlaid tiered shapes around the video feed with a standard input device like a mouse, stylus, or joystick to control the visual focus of the digital or physical character.

27 Claims, 9 Drawing Sheets

1     2     3

1

2

3

4

METHOD FOR CONTROLLING A COMPUTER GENERATED OR PHYSICAL CHARACTER BASED ON VISUAL FOCUS

CROSS-REFERENCE TO RELATED APPLICATION

This application claims the benefit of U.S. Provisional Patent Application No. 60/848,966, filed on Oct. 3, 2006.

FIELD OF THE INVENTION

The present invention relates generally to the field of controlling computer generated or robotic characters. Specifically the invention presents a method for controlling the visual focus of a character in a way that mimics the visual focus of live creatures such as humans.

BACKGROUND OF THE INVENTION

Two important factors are critical in creating the impression that a computer generated or physical character is intelligently interacting with their visual environment. The first is the ability of a character to maintain visual contact with subjects in its field of view. The second is the way in which that character moves to maintain its visual contact or switch visual contact to a new subject. It is often desirable to direct the character's motion in more complex ways than simply moving its head left, right, up, and down. Those trained in the discipline of animation will recognize that life-like characters have a clear process by which they redirect their gaze. Live creatures tend to have tiers of movement when moving to look at a subject. They first lead with their eyes, then follow with head movement, and then torso movement. For example, when a human looks up at an object flying overhead (FIG. 1A), she first rolls her eyes upward (FIG. 1A, frame 1), then leans her neck back tilting her head up towards the sky (FIG. 1A, frame 2). If the object is very high above, the human observer may lean her spine backwards (FIG. 1A, frame 3). If a human wants to look at an object to her left (FIG. 1B), she may first roll her eyes in that direction (FIG. 1B, frame 1) before turning her head to the left (FIG. 1B, frame 2). For a fuller perspective, or for more comfortable viewing, the human may next shift her upper torso, or whole body, to the left (FIG. 1B, frame 3).

Traditionally, in the field of entertainment animatronics, the visual focus (or "gaze") of puppeteered robotic characters is controlled through a mechanical input device like a radio controller or joystick. The operator maintains visual contact with the robot's environment directly or through a video feed of the robot's immediate surroundings. The operator controls the gaze of the robot in response to stimuli in the robot's environment, usually by manipulating knobs, control sticks and/or buttons on the aforementioned mechanical input device.

In the traditional method, the operator will need to split his/her visual attention between the local space of the mechanical input device and the external space of the robot in its environment. This split of attention hinders the operator's ability to observe and rapidly respond/react to changes in the robot's environment. A split interface does not provide adequate feedback for the operator to react to, and maintain visual contact with, any one subject in the robot's field of view. Further, traditional control methods do not provide the operator with means for using gaze to control complex movements and recreate a more realistic human-like movement therewith.

What is needed is an intuitive interface for controlling a character's visual focus by integrating gaze control and character movement within the character's visual environment. The present invention overlays a visual feed of the character's environment with digital controls. Such overlaying allows an operator to see both the character controls and environment for that character simultaneously, and in context. This integration enables the operator to quickly react to changes in the character's environment while providing an intuitive, effective interface to create more life-like motions in a character as its gaze shifts around a particular Scene. The same invention allows an operator to control the visual focus of digital computer generated characters and physical robotic characters using the same interface and method.

SUMMARY OF THE INVENTION

A main object of the present invention provides an intuitive interface to control the visual focus of a computer generated character, or a physical robotic three-dimensional character. The operator is presented with a video feed from a real world environment, or a computer generated ("CG") environment surrounding the character. An interface to display and control the visual gaze of the character is overlaid onto that video feed. The interface comprises one or more Tiered shapes which represent the levels of visual focus for the physical or CG character. The operator uses an input device such as a mouse, stylus, or joystick to manipulate the overlaid interface. Values outputted from that interface are used by the character's control system to move the character in a more believable, life-like manner.

BRIEF DESCRIPTION OF THE DRAWINGS

FIG. 2 are diagrams showing several possible relationships between a character being controlled and the invention with the boxes therein representing separate software systems.

In FIG. 7A, light oval areas are shown over faces automatically detected with computer vision. In frame 2 of FIG. 7B, a selected face for visual focus tracking is shown with a relatively darker border. Frames 3-4 of FIG. 7B show how the user interface keeps the selected face at the center of the character's visual focus.

DETAILED DESCRIPTION OF PREFERRED EMBODIMENTS

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated apparatus, and such further applications of the principles of the invention illustrated herein, as would normally occur to persons skilled in the art to which the invention relates.

Figure 2A:
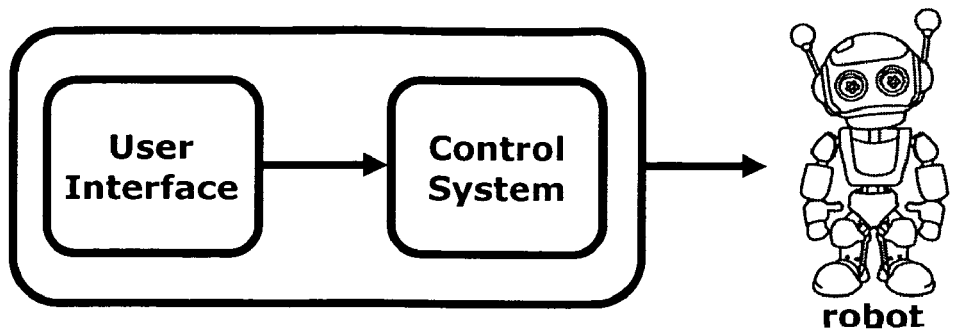
In FIG. 2A, two subsystem boxes are surrounded by a larger box representing the same software application.
Figure 2B:
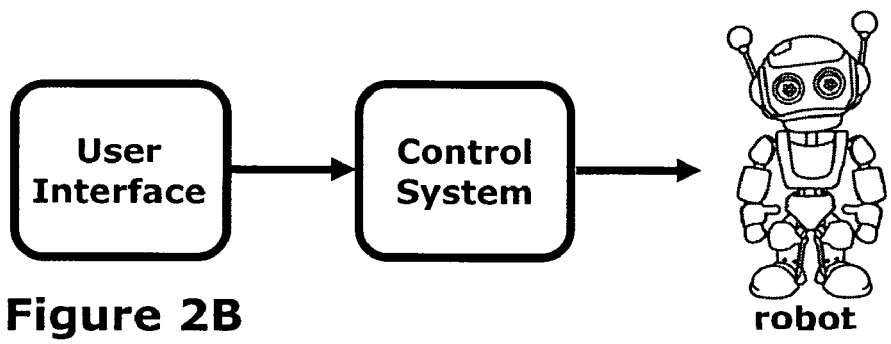
In FIG. 2B, the two boxes are more distinct, indicating they are part of different software applications.
Figure 2C:
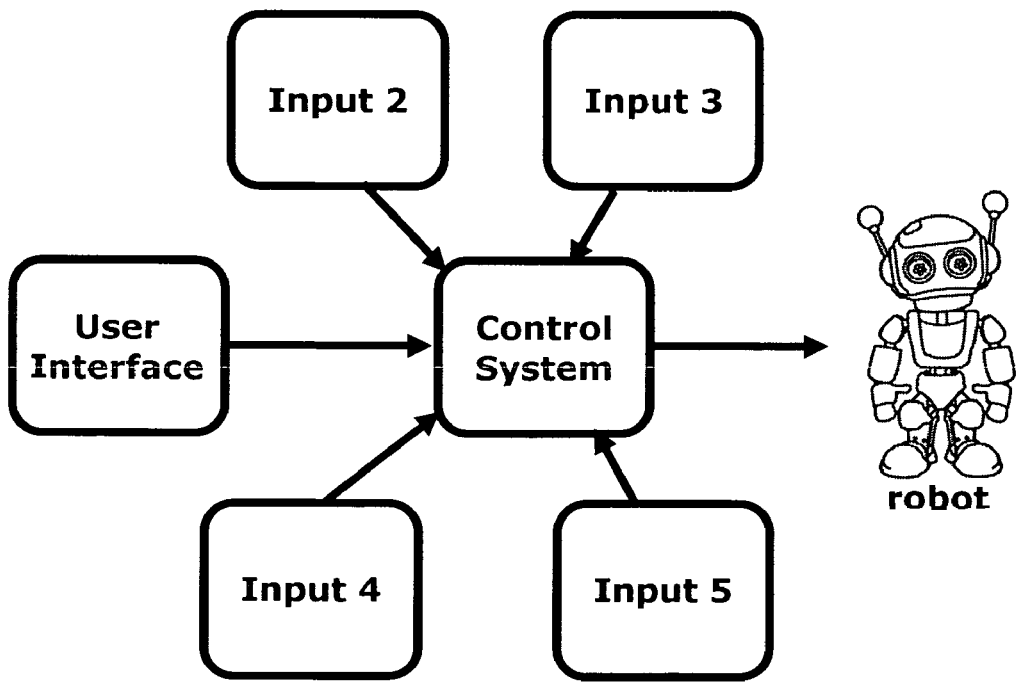
In FIG. 2C, the control system is fed information from multiple input sources.

The purpose of the invention is to provide an uncomplicated, yet robust method of using visual focus to aid in the control of a character. One preferred embodiment of this invention consists of a user interface software application, a robot control system software application, both of which run on one or more computer systems, and a physical character, such as an animatronic figure or robotic toy. As illustrated in FIGS. 2A and 2B, the user interface and robot control system may be combined into a single software application (FIG. 2A), or run as two separate software applications (FIG. 2B). The output of such user interfaces is an input into the robot control system. There may be still other inputs into the robot control system as well. FIG. 2C shows a system that receives inputs from multiple sources, Inputs 2 through 5 as shown, beyond the input received from its main user interface.

Figure 3:
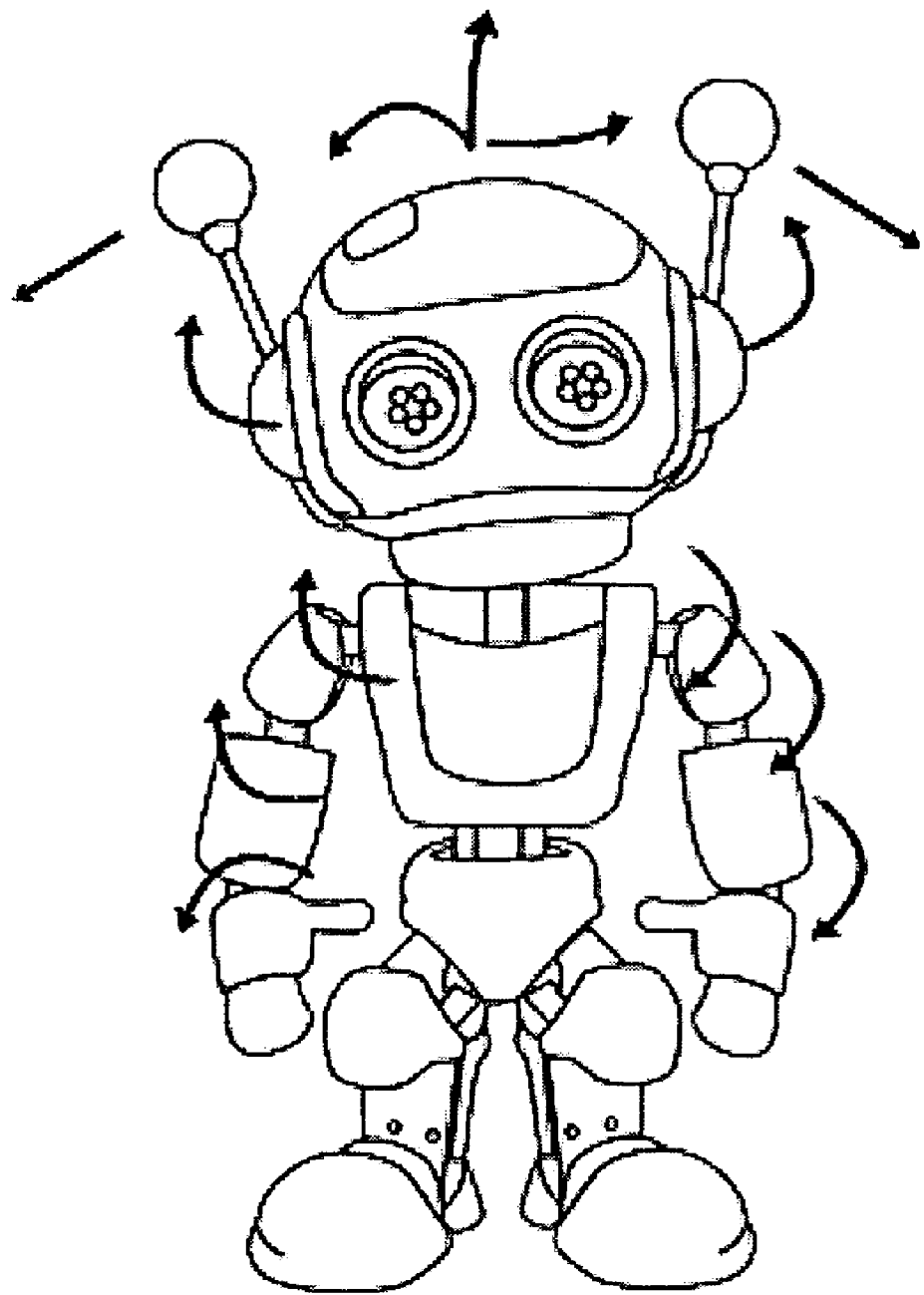
FIG. 3 is a two-dimensional drawing of a physical three-dimensional robotic character represented as a robot whose arms and head move in several directions. The arrows superimposed over the joints of this character show the direction(s) in which such character joints may be turned. The three arrows over the head of this character indicate that character's ability to rotate its head along all three axes.

One particular physical character is illustrated in accompanying FIG. 3. It is a representative robotic character depicted two dimensionally. It should be understood, however, that with the present invention numerous other character configurations are possible. Each movement or "movement attribute" of a character is called a "degree of freedom". That term, commonly understood in engineering and animation disciplines, represents each rotation and translational movement possible along a given axis. A "degree of freedom" may also refer to movement through a range of values for some non-moving parts. Examples include, but are not limited to, light intensity, light color, audio pitch, or audio volume.

At least one camera is mounted in the head of a physical character. The image or feed from that camera is inputted to the user interface software application. Although the camera is typically mounted inside a character's head for imitating a first person view of that character's environment, it is understood that said camera may be mounted in any number of locations including a static, third person view slightly behind a more stationary character. For an operator controlling a computer generated, or CG, character in a computer generated environment, the 'camera' is not as much a physical device, but rather more of a rendered view of the CG character's surrounding environment. Further, it is possible for an operator to control a computer generated character presented on a display device in a real-world physical environment. In that case, a camera typically located near the display device shows the environment immediately surrounding the display device.

Figure 4A:
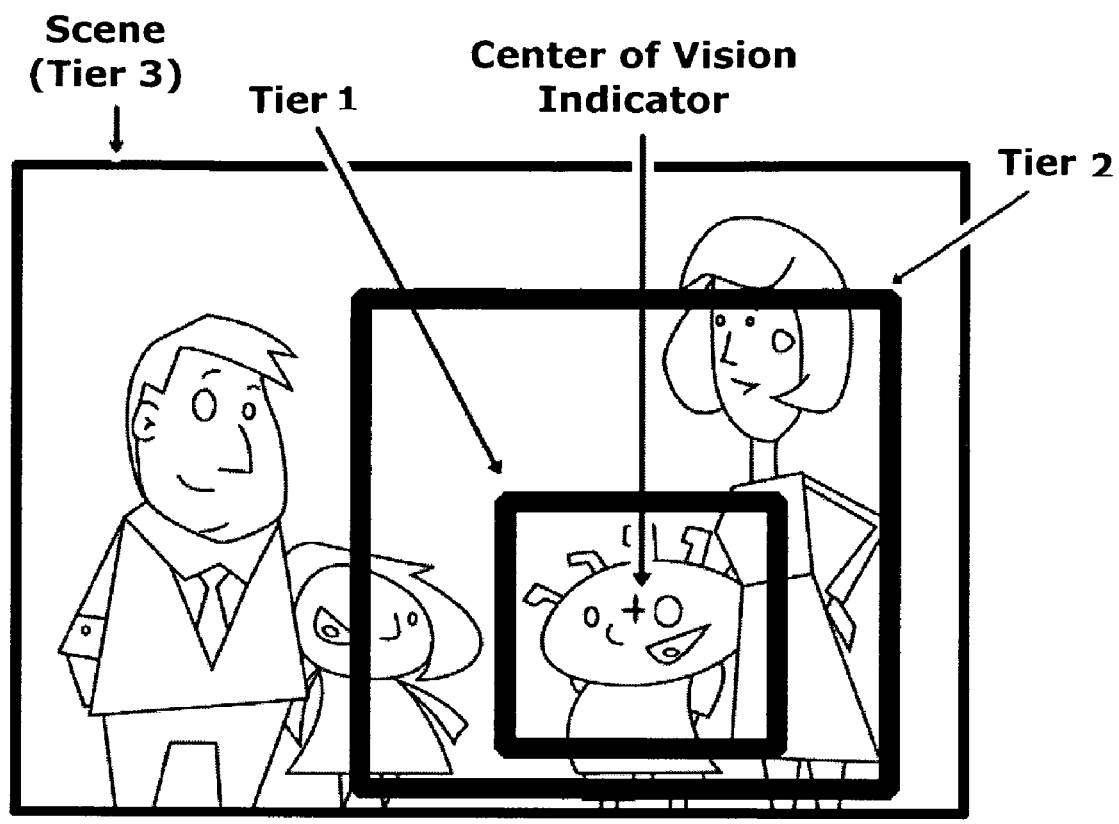
FIG. 4A depicts a drawing of the user interface in one preferred embodiment used to control a character's visual focus. The user interface is presented over a simple sketch representing a video feed of four people standing in front of the operator-controlled character.

FIG. 4A illustrates an implementation of a user interfaces for one control method of this invention. A representative 'Scene' depicts the view or 'feed' from a first fixed camera. The digital controls are layered directly onto the Scene. The rectangular boxes so shown represent varying layers of character visual focus in that Scene. The small box, labeled 'Tier 1' in FIG. 4A, surrounds the center of the character's visual focus, i.e. what that character is currently focusing on. The next, slightly larger box (labeled 'Tier 2' in FIG. 4A) represents a slightly broader area of visual focus, i.e. that the area of the Scene which the operator-controlled character is currently 'seeing'. Finally, 'Tier 3' in FIG. 4A represents the operator-controlled character's immediate environment. As shown, Tier 3 encompasses the entire Scene in FIG. 4A.

While the embodiment at FIG. 4A uses three Tiers of control, with box-shaped overlays, the invention allows for any number of Tiers of control. Furthermore, the visual representation of Tiers may assume various shapes. An example of one alternative embodiment includes the oval-shaped Tiers in accompanying FIG. 4B.

Figure 4B:
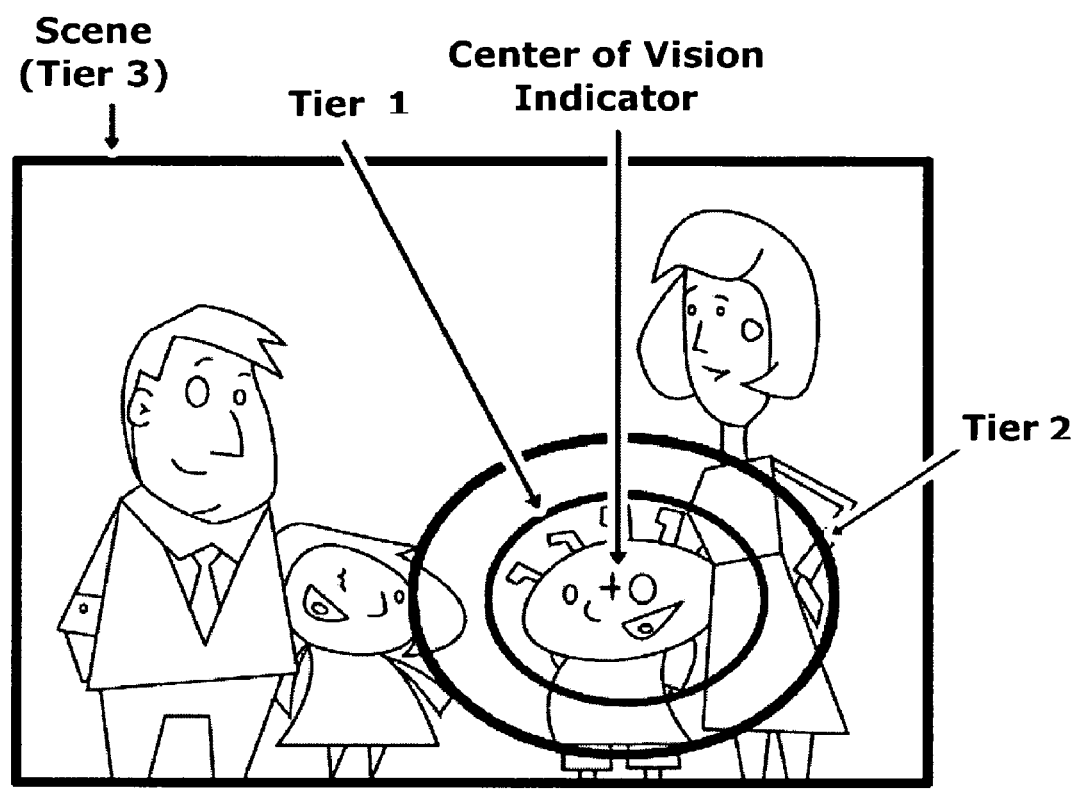
FIG. 4B depicts an alternate user interface that contains different Tiered shapes.

The cross-haired 'Center of Vision' indicators inside the Tier 1 box of FIG. 4A and the Tier 1 oval of FIG. 4B, represent the exact center of visual focus of a character. This is the initial input into the system. The character operator primarily manipulates the Center of Vision on the interface using an input device like a mouse, stylus, or joystick. With that input device, the character operator selects a point on the Scene (to which the Center of Vision indicator will automatically move) or drags the Center of Vision indicator to a point on the Scene. This action moves the character's visual focus from its current point to the new operator-selected point. If the operator-selected point is still within the Tier 1 region (FIG. 4A) only the Center of Vision indicator moves. If the visual focus point selected is outside Tier 1 proper, the whole of the Tier 1 region will move until the desired new point is within Tier 1. If the operator-selected point is initially outside of Tier 2, then all Tiers will move, in a coordinated manner, until they all contain the new operator-selected point.

Figure 6A:
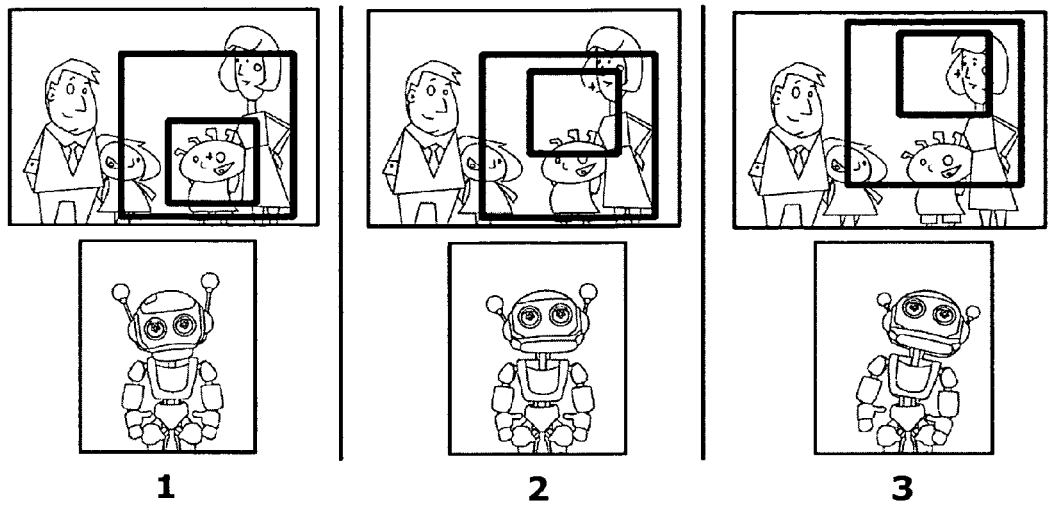
FIG. 6A depicts how a character moves in response to an operator moving the Center of Vision Indicator upwards on the interface in one preferred embodiment.
Figure 6B:
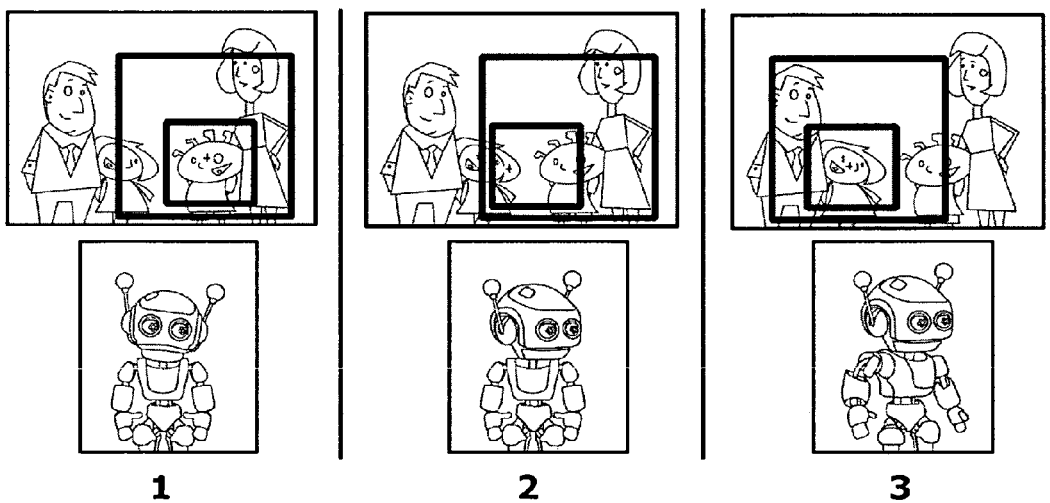
FIG. 6B depicts how the character moves in response to an operator moving the Center of Vision Indicator to the left on the interface.

The top 3 frames in FIGS. 6A and 6B show the effect on interfaces when various points in the Scene are selected. For FIG. 6A, visual focus is shifted from original subject (small boy) up to a new subject (tall female). For FIG. 6B, visual focus is shifted from the original subject (small boy) left to a new subject (young girl.) Preferably, the Tiers of this interface method have a clear "parent/child" relationship with the inner "child" Tiers always remaining inside their larger, "parent" Tiers. With reference to FIGS. 4A and 4B, Tier 2 is the child of Tier 3, Tier 1 the child of Tier 2, and the Center of Vision, the child of Tier 1. Likewise, Tier 3 is considered the parent of Tier 2, Tier 2 the parent of Tier 1, and Tier 1 the parent of the Center of Vision.

Figure 5:
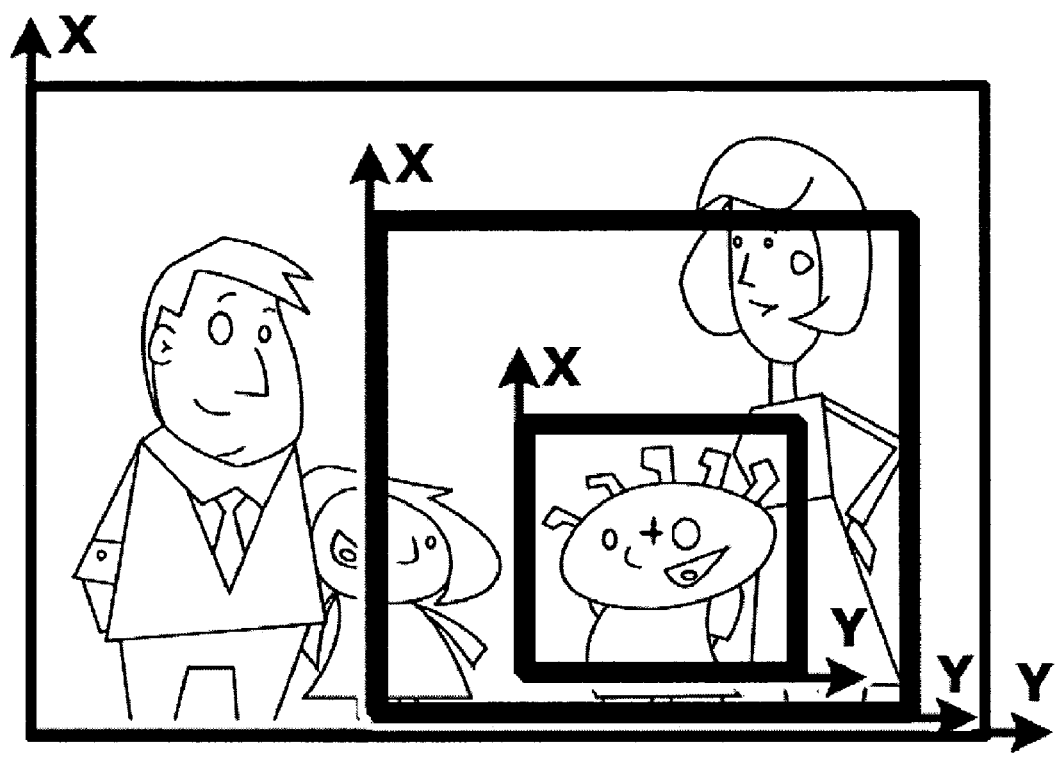
FIG. 5 illustrates how Tiered boxes in the user interface can be expressed on a two-axis coordinate system.

The interior for each Tier shape can be expressed using a two dimensional coordinate system like that shown in FIG. 5. The motion of each Tier shape (therein, a box) and the Center of Vision indicator along the x and y-axes of their parents are associated with degrees of freedom of the character. In one representative embodiment, the movement of the Center of Vision indicator along the x-axis inside the Tier 1 box (FIG. 5) is associated with the left and right movement of the character's eyes (FIG. 6B, frame 1). Similarly, the Center of Vision indicator movement along the y-axis inside the Tier 1 box correlates with an up and down motion of the character's eyes (FIG. 6A, frame 1). When the Center of Vision indicator movement causes Tier 1 to move along the x-axis of Tier 2, there is a corresponding left and right motion of the character's head (FIG. 6B, frame 2). A similar relocating of Tier 1 along the y-axis of Tier 2 results in an up and down motion of the character's head (FIG. 6A, frame 2). When taken to an extreme in one preferred embodiment, a side-to-side movement of the Tier 2 box along the x-axis of Tier 3 results in the character's waist twisting left and right per frame 3 of FIG. 6B. A similar coordinated movement of Tier 2 along the y-axis of Tier 3 translates to the character's torso leaning forward and back as per the third frame in FIG. 6A.

Figure 1A:
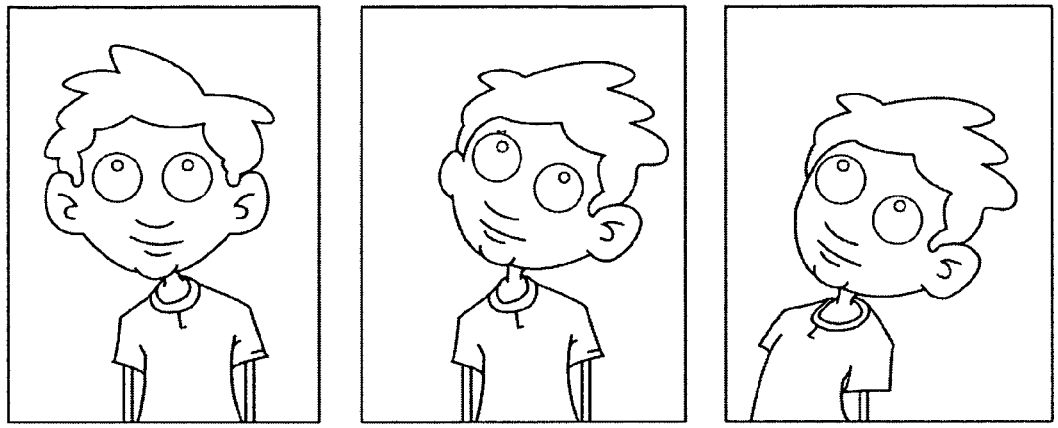
FIGS. 1A & 1B depict the sequences of body motion that takes place when a human looks up (FIG. 1A) or looks to one side (FIG. 1B).
Figure 1B:
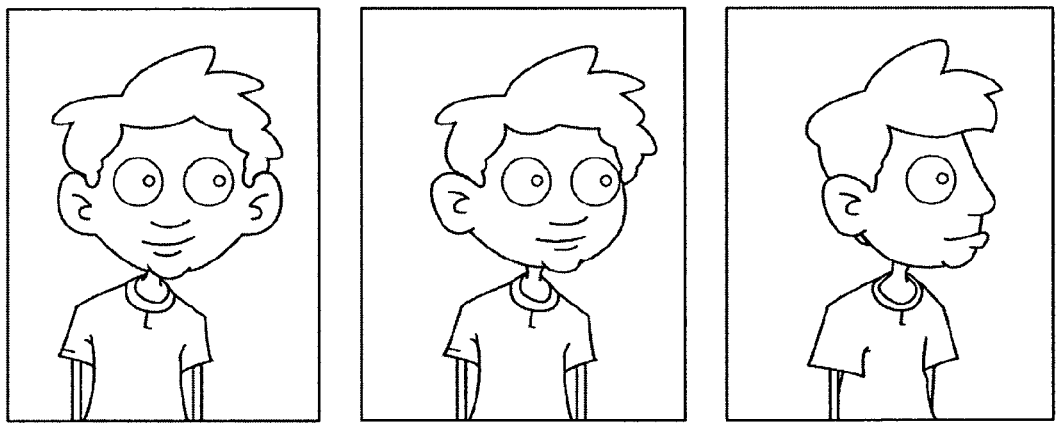

Comparing FIGS. 1A and B with those in FIGS. 6A and 6B, it becomes clear the extent to which Tiered interfacing per this invention mimics the Tiered movement of humans as their gazes shift directionally. The relationship between Tier positions and the Scene can also be completely customized. The preferred embodiments calls for a physically accurate relationship such that when the Center of Vision indicator is directly over a point on the Scene, a human observer would believe that the operator-controlled character is actually looking at that precise point. Such correlation makes it easy for an operator to maintain believable visual contact with an object with which the character is interacting.

In one embodiment of this invention, the association of degrees of freedom to Tier movement is set up in a configuration file. That file can then be used by the interface to determine the correct output for sending to the control system. Critical inputs into the interface include:

The list of degrees of freedom affected by each axis of each Tier shape.

A function for each affected degree of freedom that determines the output value for the degree based on the positional value of the center of the child tier along its parent's Tier axes.

The positional values of the center of each child tier center along its parent's Tier axes.

In one preferred embodiment, the left-to-right angle of a character's head ranges from −45° to +45°, and the left-to-right movement of that character's head is controlled by Tier 1. The formula used for determining the preferred value of character head angle is:

$$V(x) = ((D_{max} - D_{min}) * (x - X_{min}) / (X_{max} - X_{min})) + D_{min}$$

where V is the value output by the user interface for the head-left/right degree of freedom, x is the x-coordinate of the center of Tier 1 along the x-axis for Tier 2, $D_{max}$ is the maximum value of the head-left/right degree of freedom (in this case, +45°), $D_{min}$ is the minimum value of the head-left/right degree of freedom (in this case, −45°), $X_{min}$ is the minimum x-coordinate on the x-axis for Tier 2, and $X_{max}$ is the maximum x-coordinate on the x-axis for Tier 2.

Those skilled in the art will realize that outputs from the user interface of this invention may be combined with still other character control methods before being enacted on the physical character. One such combination includes a character animation system that can play pre-made animations on a character. FIG. 2C illustrates how the invention may be integrated in a larger character control system with other inputs.

Figure 7A:
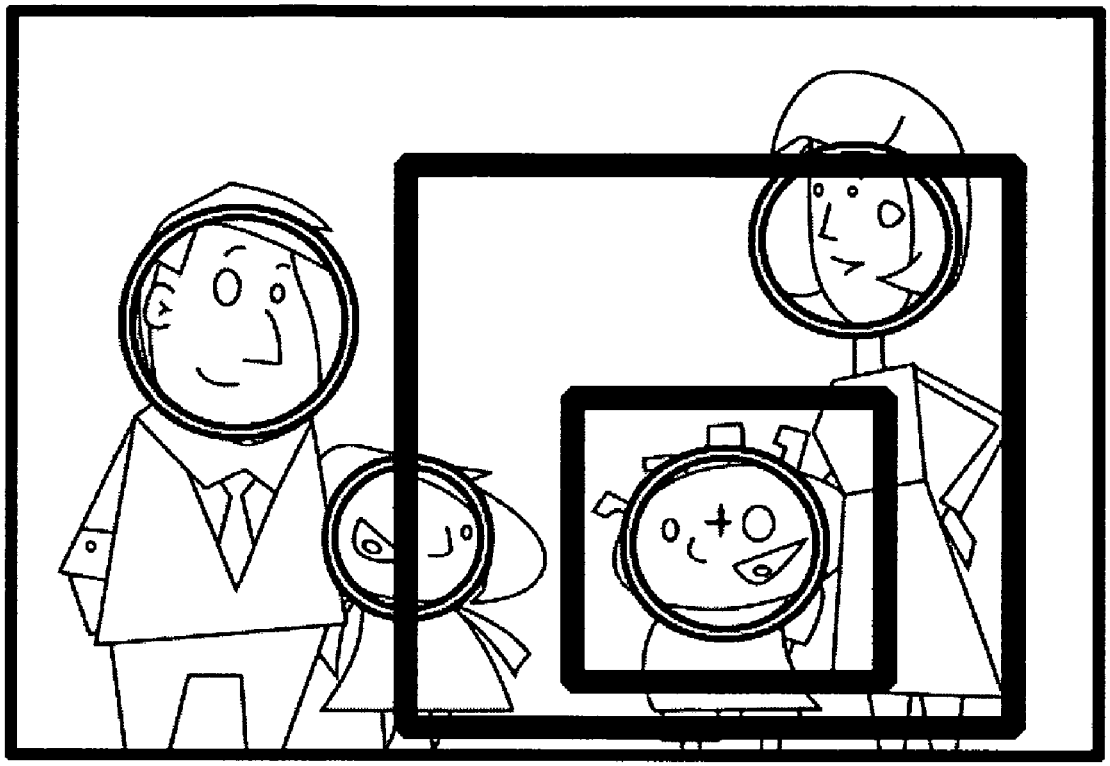
FIGS. 7A and 7B illustrate how the user interface of preferred embodiments may be modified to include input from computer vision algorithms and tools.
Figure 7B:
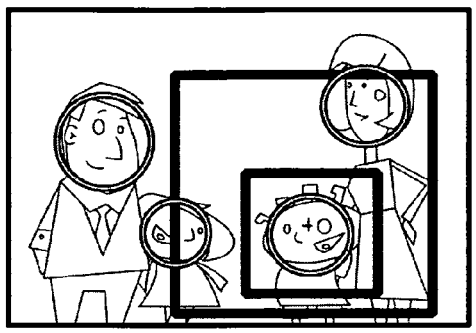
Figure 7B:
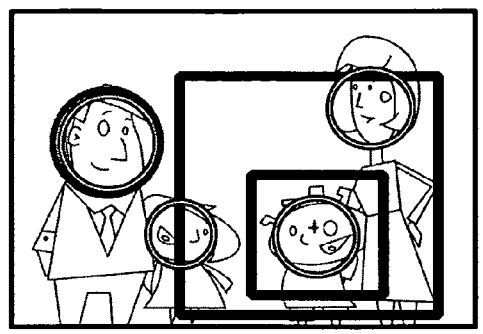
Figure 7B:
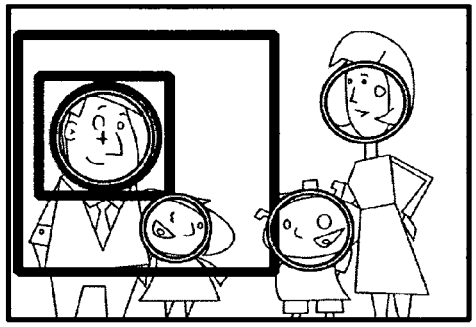
Figure 7B:
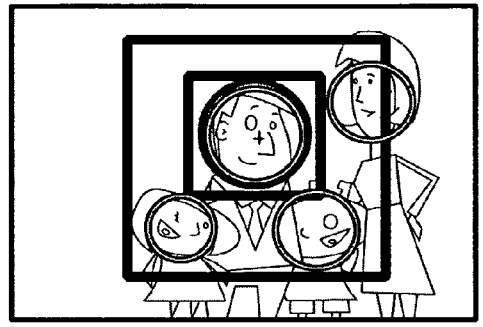

Alternatively, preferred embodiments may be combined with elements of Computer Vision like object tracking and/or face recognition. FIG. 7A illustrates how computer vision may be used to highlight faces or other points of interest in a Scene. Such points of interest can now be selected through the interface of this invention (FIG. 7B, frame 2) and used to affect the visual focus of the operator-controlled character. For example, the operator may choose to have a character turn immediately towards the point of interest, refocusing the character's gaze on that point (FIG. 7B, frame 3). The operator may also choose to have the character track or automatically follow a particular point of interest—that is, move in such a way as to keep the point of interest aligned with the character's Center of Vision, even if that point of interest itself moves within the Scene (FIG. 7B, frame 4). Alternatively, the operator may choose to have the character avoid looking at a particular point of interest. For instance, the operator may have its character purposefully turn away from an object/other character even as that object/other character (point of interest) moves directly into the middle of the operator-controlled character's field of vision.

An exhaustive list of all methods of Computer Vision, and their potential applications, is beyond the scope of this document. Those skilled in the art will understand there are many relevant applications. Any Computer Vision tool can effectively be treated as an input for affecting the ideal Center of Vision of an operator-controlled character. Thus, the invention provides an intuitive control interface for integrating Computer Vision systems with character gaze control.

What is claimed is:

1. A method for controlling movement of a physical three-dimensional robot, the method comprising the steps of:
    providing the physical three-dimensional robot;
    providing a computer system including a display device and an input device;
    providing a user interface software connected to the display device and the input device, wherein the user interface software is capable of manipulating a plurality of digital controls displayed on the display device in response to input from the input device;
    providing a control system software connected to the physical three-dimensional robot and the user interface software, wherein the control system software is capable of manipulating the physical three-dimensional robot in response to the manipulation of the plurality of digital controls by the input device;
    providing an environment on the display device that represents a field of vision of the physical three-dimensional robot, wherein the physical three-dimensional robot is not displayed in the environment on the display device;
    creating the plurality of digital controls to overlay onto the environment, wherein the plurality of digital controls are capable of being overlaid onto each other by the input device to cause movement of the physical three-dimensional robot; and
    moving one digital control of the plurality of digital controls from a first position to a second position within the environment on the display device in response to input from the input device, wherein such movement causes a movement of the physical three-dimensional robot.

2. The method of claim 1, wherein the step of moving one of the plurality of digital controls further comprises move a positioning indicator.

3. The method of claim 2, wherein the step of moving the positioning indicator moves a visual focus of the physical three-dimensional robot in multiple degrees of freedom.

4. The method of claim 2, wherein the step of moving the positioning indicator moves a visual focus of the physical three-dimensional robot from a first point to a second point.

5. The method of claim 4, wherein the first and second points can be mapped on a two-dimensional coordinate system.

6. The method of claim 1, wherein the plurality of digital controls are tiered in layers.

7. The method of claim 6, wherein a center of vision indicator is located in an innermost tier of the digital controls.

8. The method of claim 6, wherein the tiered digital controls move in conjunction with one another.

9. The method of claim 1, wherein the plurality of digital controls comprise of one or more graphical shapes.

10. The method of claim 1, wherein the wherein the step of providing an environment on the display device that represents a field of vision of the physical three-dimensional robot further comprises the step of providing environment in two-dimensions.

11. The method of claim 1, wherein the physical three-dimensional robot includes a camera-generated live video feed.

12. The method of claim 1, wherein the environment is real world.

13. The method according to claim 1, wherein the movement is selected from the group consisting of the movement of eyes, a head, a torso, arms, and full body.

14. The method according to claim 1, wherein the one digital control of the plurality of digital controls is a center of vision indicator of the physical three-dimensional robot.

15. The method according to claim 1, wherein the movement is the movement of the physical three-dimensional robot toward the second position.

16. The method according to claim 1, wherein the movement is the movement of the physical three-dimensional robot away from the second position.

17. A method for controlling movement of a computer generated character, the method comprising the steps of:
providing the computer generated character;
providing a computer system including a display device and an input device;
providing a user interface software connected to the display device and the input device, wherein the user interface software is capable of manipulating a plurality of digital controls displayed on the display device in response to input from the input device;
providing a control system software linked to the computer generated character and the user interface software, wherein the control system software is capable of manipulating the computer generated character in response to the manipulation of the plurality of digital controls by the input device;
providing an environment on the display device that represents a field of vision of the computer generated character, wherein the computer generated character is not displayed in the environment on the display device;
creating the plurality of digital controls to overlay onto the environment, wherein the plurality of digital controls are capable of being overlaid onto each other by the input device to cause movement of the computer generated character; and
moving one digital control of the plurality of digital controls from a first position to a second position within the environment on the display device in response to input from the input device, wherein such movement causes a movement of the computer generated character.

18. The method of claim 17, wherein the tiered, digital controls comprise of one or more graphical shapes.

19. The method of claim 17, wherein the tiered digital controls move in conjunction with one another.

20. The method of claim 17, wherein the step of providing an environment on the display device that represents a field of vision of the computer generated character further comprises the step of providing the environment in two-dimensions.

21. The method of claim 17, wherein the step of providing an environment on the display device that represents a field of vision of the computer generated character further comprises the step of providing a camera-generated live video feed.

22. The method of claim 17, wherein the environment is real world.

23. The method according to claim 17, wherein the movement is selected from the group consisting of the movement of eyes, a head, a torso, arms, and full body.

24. The method according to claim 17, wherein the one digital control of the plurality of digital controls is a center of vision indicator of the computer generated character.

25. The method according to claim 17, wherein the movement is the movement of the computer generated character toward the second position.

26. The method according to claim 17, wherein the movement is the movement of the computer generated character away from the second position.

27. The method of claim 17, wherein the plurality of digital controls are tiered in layers.

* * * * *